Nov. 14, 1950     W. L. BERSSENBRUGGE     2,529,905
APPARATUS FOR COMBINING TWO CAMERAS
Filed March 14, 1946     2 Sheets-Sheet 1
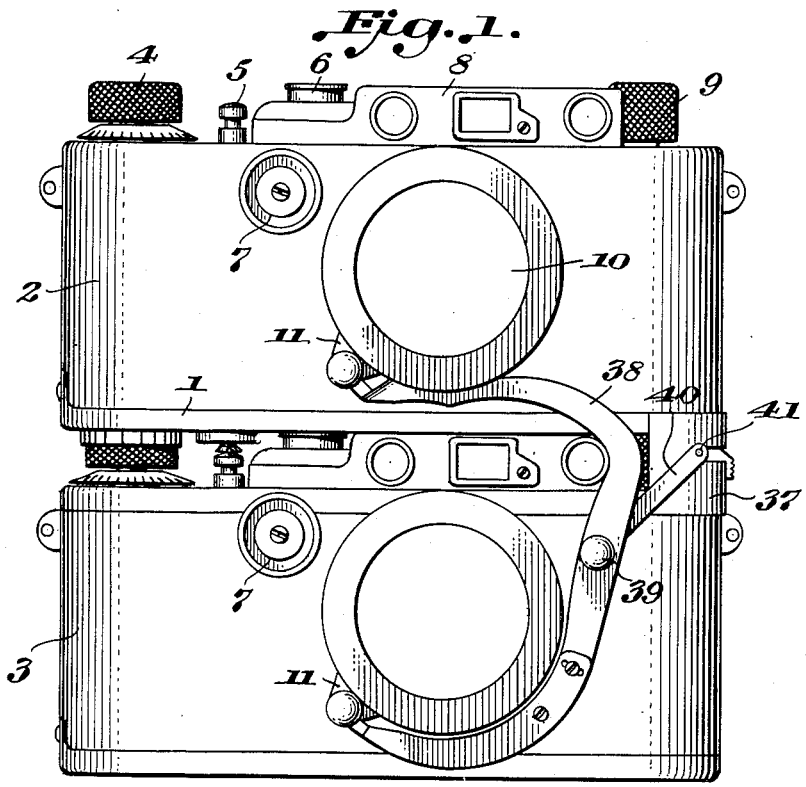
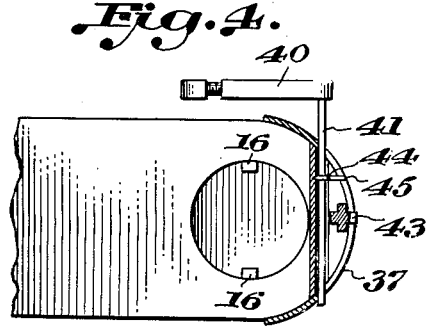
INVENTOR
W. L. Berssenbrugge
BY Wenderoth, Lind & Ponack
ATTORNEYS Nov. 14, 1950 W. L. BERSSENBRUGGE 2,529,905
APPARATUS FOR COMBINING TWO CAMERAS
Filed March 14, 1946 2 Sheets-Sheet 2

INVENTOR
W. L. Berssenbrugge

BY *Wenderoth, Lind & Ponack*
ATTORNEYS

Patented Nov. 14, 1950

2,529,905

UNITED STATES PATENT OFFICE 2,529,905

APPARATUS FOR COMBINING TWO CAMERAS

Willem Lodewijk Berssenbrugge, The Hague, Netherlands, assignor to E. Leitz, Inc., New York, N. Y.

Application March 14, 1946, Serial No. 654,251
In the Netherlands February 15, 1941

Section 1, Public Law 690, August 8, 1946
Patent expires February 15, 1961

11 Claims. (Cl. 95—11)

The invention relates to an apparatus for combining two cameras. Means of this kind are known. The German Patent 559,245, for instance, describes a holder having a hinged locking plate enabling two so called box cameras to be held side by side. The locking plate is provided with a pivoted member enabling the shutters of the two cameras to be actuated simultaneously if the cameras are placed in the holder in a certain manner.

It is a drawback of means of this type that they take up too much room.

For the purpose of combining a camera having a loading cover, with another camera, an apparatus is provided according to the invention, in the form of a cover for one camera to which the other camera may be detachably secured and which is provided with means for transferring actuating movements from one camera to the other. The actuating movements may be those for the film winding means, the focus adjusting means for releasing the shutter, etc.

By the apparatus according to the invention the advantage is achieved that the distance between the objectives of the two cameras may be reduced to the smallest possible value and that working the combined cameras need not be more complicated than working a single camera.

Another advantage is that the two cameras may be easily combined, without the necessity of carrying a separate expedient specially designed for this purpose; the cover may be left on one camera, and the other camera may or may not be secured to it, according to need. The cameras may, without alteration, be employed either together or separately.

The invention will be explained with reference to the modification shown by way of example in the drawing. This modification is concerned with the combination of two cameras of the Leica type. The invention is, however, not confined to this modification.

Fig. 1 is a front view of two cameras combined by means of the apparatus according to the invention.

Fig. 4 is a cross section of a part of the cover, along the line IV—IV in Fig. 2.

Figure 2:
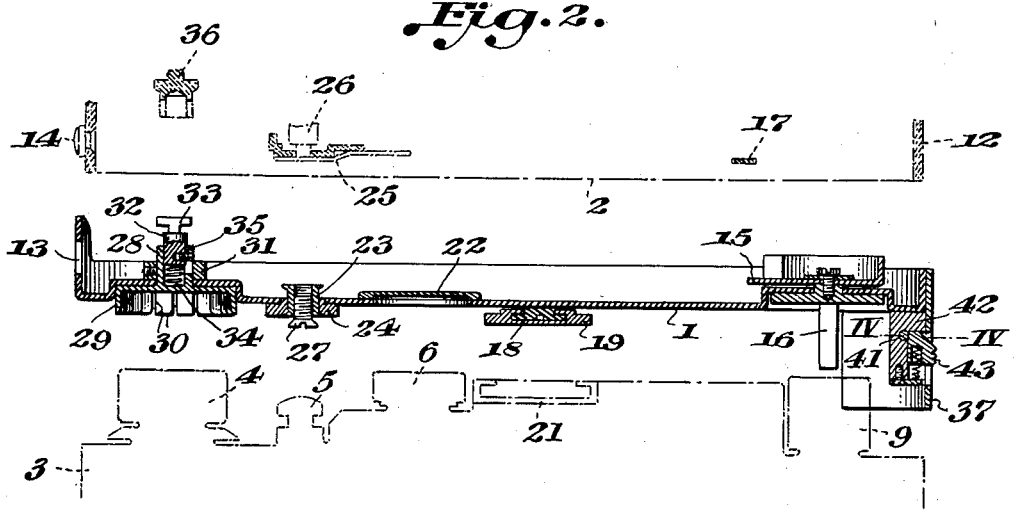
Fig. 2 shows the apparatus according to the invention in longitudinal section. This apparatus is in the form of a cover for one camera to which the other camera may be detachably secured.

In Fig. 1 the cover is denoted 1. This cover closes the bottom of the upper camera 2, so that it replaces the conventional cover, and fits the top of the lower camera 3. The cameras are of conventional design. When employing the cover 1 the distance between the optical axis of the two objectives is about 65 mm. In the upper camera 4 is the knob for winding the film in the camera and winding up the shutter, 5 is the knob for releasing the shutter, 6 and 7 are the knobs for adjusting the time of exposure, 8 is the section comprising the finder and the coupled distance meter, 9 is the knob for rewinding the film, and 10 is the objective provided with a focusing adjusting arm 11. The same holds for the lower camera. In the type of camera selected by way of example the coupled distance meters may be omitted. This merely results in a minor modification of the construction of the cover 1. In case the distance meter is omitted only in the upper camera the construction of the cover will remain unchanged.

Some further details of Fig. 1 will be considered later on. Fig. 2 shows the construction of the cover 1. This figure shows how the cover will co-operate with each of the combined cameras. The camera 2, which is closed by the cover 1, and the camera 3, which may be detachably secured to the cover, are shown in dotted lines.

The cover 1, when placed on the camera 2, will encircle the edge thereof. At the left as seen in Fig. 2 the opening 13 in the cover will receive the knob 14 of the camera 2. At the right the cover 1 is provided with a pivoted bolt 15 which may be rotated a certain angle by means of two projecting pins 16 not interfering with the knob 9 of the lower camera. The bolt 15 on being rotated will come above a stationary member 17 of the upper camera so that the required connection between this camera and the cover 1 is attained.

In the middle of the cover 1 there is a fixed slide 18 along which a bolt 19 may be shifted parallel to the plane of the cover 1. This bolt 19, at the free end of which a knob 20 is provided for operating the bolt, serves for securing the lower camera 3 to the cover 1. In its inward position the bolt 19 is received by a slot 21 provided in the top of the lower camera; under normal conditions this slot may be used, for instance, for the attachment of an auxiliary finder or any other expedient. Thus the bolt 19 is adapted to bring about a connection between the slide 18 and the slot 21.

The raised section 22 of the cover 1 is for the purpose of receiving the knob 6 of the lower camera.

To the left of the section 22 of the cover there is a cylindrical member 23 designed to move freely in a direction perpendicular to the plane of the cover 1 by being mounted in a ring 24 secured to the cover 1. The member 23 is flanged at both its upper and lower end to prevent its falling out of the ring 24. The member 23 is for transferring the movement for releasing the shutter from the upper to the lower camera. A pressure may be exerted on the upper end of the member 23 by means of a leaf spring 25 which is operated by pin 26 connected to the knob 5 of the upper camera. The pressure exerted is thus transferred to the knob 5 of the lower camera, so that the shutters of both cameras are released. Usually it will be desirable that both shutters are operated simultaneously. Therefore an adjustable element 27 is provided in the cylindrical member 23, the position of which with respect to the cylindrical member 23 may be altered. By appropriate adjustment of the element 27 the desired simultaneousness or separate operation may be realised.

At the left hand end of the cover 1 as seen in Fig. 2 a mechanism is provided for transferring a rotative movement from the upper camera to the lower one. This mechanism comprises a hollow shaft 28 passing through the cover 1 and merging into a ring 29 of radially resilient structure which, for this purpose, is provided with axial slits 30. The hollow shaft 28 is surrounded by a ring 31 lying at the opposite side of the cover 1 from the ring 29. The hollow shaft 28 may be rotated with respect to the cover 1 together with the ring 31 and the ring 29. Inside the hollow shaft 28 there is a pin 32 having a flattened end 33. This pin 32 is pressed upwards by a coiled spring 34 but is checked by a screw 35. The screw 35 passes through a slot in the wall of the shaft 28, so that the pin 32 may be moved up and down in the hollow shaft 28.

The cover 1 being secured to the upper camera the flattened end 33 of the pin 32 will be received by a recess of a member 36 which is arranged in the upper camera and is in connection with the knob 4. If this knob 4 is rotated the rotation will be transferred to the knob 4 of the lower camera since the ring 29 fits said knob and resiliently embraces the same. In this manner it will be possible to wind the film and to wind up the shutter in both cameras simultaneously.

Finally the extreme right hand section of the cover 1 will be considered. In Fig. 1 this section is denoted 37 and its construction is shown in detail in Figs. 2, 3, 4. The section 37 also serves for the purpose of transferring actuating movements from one camera to the other.

From Fig. 1 it is seen that the focusing arms 11 of the objectives of both cameras are coupled by a link 38. By means of this link the objectives may be simultaneously adjusted. The ends of the link 38 work upon knobs at the ends of the focusing arms 11 (see also Fig. 3). These knobs, when the cameras are being focused, each describe a circle about the centre of the objective in question. In order to guarantee equal angular displacements of the two focusing arms 11 the link 38 has, between its ends, a third fulcrum 39. At this point an arm 40 of adjustable length is pivoted to the link 38. The arm 40 lies in a plane parallel to that of the link 38 and, at its free end, carries an axis 41 which is perpendicular to the plane of the link 38. The axis 41 is supported in the section 37 of the cover 1 and its distance from the point 39 is equal to that of the knobs of the focusing arms 11 from the centres of the objectives 10. In this manner as one of the objectives is being focused the other is focused as well. Below the point 39 the link 38 is divided, in view of some possible play in the distance between the ends of the focusing arms 11.

Figure 3:
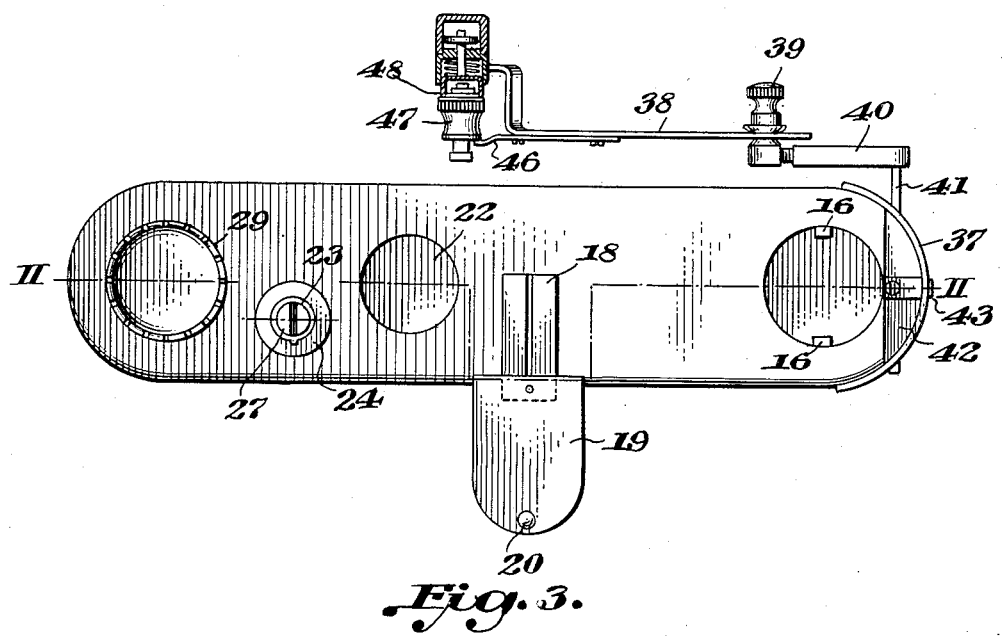
Fig. 3 is a front view of the cover of Fig. 2.

The manner in which the axis 41 is supported in the section 37 of the cover is shown in Figs. 2, 3 and 4. The section 37 is in the form of a semi-cylindrical member. In a plane parallel to the plane of the cover this member is provided with a slot through which the axis 41 may be introduced into the semi-cylindrical member by parallel displacement. After having been introduced the axis 41, as shown in Fig. 2, is received by a member 42 and is held therein by a resilient bolt 43. This bolt may be shifted in a direction perpendicular to the plane of the cover to let the axis 41 pass. In order to prevent longitudinal displacement of the axis 41 the latter is provided with a collar 44 (Fig. 4) which, when the axis is being introduced, will pass through a slit 45 arranged perpendicular to the plane of the cover.

Fig. 3 shows how the free ends of the link 38 may be secured to the knobs of the focusing arms 11. This is secured by a forked construction of the free ends of the link 38; the leg 46 engaging the rear of the knob 47 and the resilient cap 48 engaging the front of said knob.

The shape of the link 38, which is shown in Fig. 1, is determined by the fact that the openings of the finder and the coupled distance meter of the lower camera should remain free in all focusing positions of the link.

The apparatus according to the invention may be employed for many purposes. The most obvious being stereoscopic photography. The cover 1 may, for instance, be constructed in such a way that the distance between the objectives of the two cooperating cameras is much greater than in normal stereoscopic photography. Stereoscopic exposures having a great base will thus be obtained. For reporting purposes it may be desirable to make two exposures at the same time with different kinds of objectives, for instance a wide angle objective and a teleobjective. Thus two different exposures of the same object will be produced. Another possibility is to make two exposures not simultaneously but with a time interval. For this purpose the element 27 (Fig. 2) should be adjusted with respect to the member 23 in such a manner that the shutter of one camera is released earlier than that of the other camera. This possibility may be of importance for making quickly succeeding exposures of rapidly moving objects. Further it is possible to make simultaneous exposures on different photographic emulsions, or with different times of exposure, or with different filters, etc.; the minor differences between such exposures are clearly recognisable in a stereoscopic image. This may be of importance for research purposes.

What I claim is:

1. An apparatus for combining two cameras comprising a loading cover on one of said cameras, means on said loading cover for securing the other camera detachably thereto, means engaging the shutter operating means of each camera acting to transmit movement of the shutter operator of one camera to the shutter operator of the other camera and means on said loading cover for transmitting the actuation of the shutter operator of the first camera to actuate the shutter operator of the second camera through said engaging means.

2. An apparatus as set forth in claim 1 wherein said means on said loading cover for securing the other camera detachably thereto includes a slidable bolt movable parallel to the plane of said loading cover.

3. An apparatus as set forth in claim 1 wherein said means on said loading cover includes a member movable in a direction perpendicular to the plane of said cover.

4. An apparatus as set forth in claim 1 wherein said means on said loading cover includes a member movable in a direction perpendicular to the plane of said cover and said member is longitudinally adjustable whereby sequential operation of said shutter operators may be obtained.

5. An apparatus for combining two cameras comprising a loading cover on one of said cameras, means on said loading cover for securing the other camera detachably thereto, means engaging the shutter operating means of each camera acting to transmit movement of the shutter operator of one camera to the shutter operator of the other camera, means engaging the film winding means of each camera acting to transmit movement of the film winding means of one camera to the film winding means of the other camera, means on said loading cover for transmitting the actuation of the shutter operator of the first camera to actuate the shutter operator of the second camera through said engaging means and means on said loading cover for transmitting the actuation of said film winding means of the first camera to actuate the film winding means of the second camera through said film winding engaging means.

6. An apparatus for combining two cameras comprising a loading cover on one of said cameras, means on said loading cover for securing the other camera detachably thereto, means engaging the focus adjusting means of each camera acting to transmit movement of the focus adjuster of one camera to the focus adjuster of the other camera and means on said loading cover for transmitting adjustment of the focus of the first camera to actuate the focus adjuster of the second camera through said engaging means.

7. An apparatus for combining two cameras comprising a loading cover on one of said cameras, means on said loading cover for securing the other camera detachably thereto, means engaging the film winding means of each camera acting to transmit movement of the film winding means of one camera to the film winding means of the other camera and means on said loading cover for transmitting the actuation of the film winding means of the first camera to actuate the film winding means of the second camera through said engaging means.

8. An apparatus as set forth in claim 7 wherein said means on said loading cover for transmitting the actuation of the film winding means of the first camera to said second camera includes a shaft passing through said loading cover and said engaging means includes a resilient cap fixed to said shaft.

9. An apparatus for combining two cameras comprising a loading cover on one of said cameras, means on said loading cover for securing the other camera detachably thereto, means engaging the focusing means of each camera acting to transmit movement of the focusing means of one camera to the focusing means of the other camera and means pivotally secured to said loading cover secured to said engaging means for simultaneously focusing the objectives of each camera.

10. An apparatus as set forth in claim 9 wherein said means pivotally secured to said loading cover comprises a curved link, an arm pivoted to said link and a shaft on said arm extending perpendicularly to the plane of said link.

11. An apparatus as set forth in claim 10 wherein said loading cover has a slot extending parallel to the plane of said cover in which said shaft is received.

WILLEM LODEWIJK BERSSENBRUGGE.

REFERENCES CITED

The following references are of record in the file of this patent:

UNITED STATES PATENTS

| Number | Name | Date |
| --- | --- | --- |
| 1,730,930 | Fritts | Oct. 8, 1929 |
| 1,743,616 | Nolan | Jan. 14, 1930 |
| 1,777,257 | Debrie | Sept. 30, 1930 |
| 1,890,074 | Briechle et al. | Dec. 6, 1932 |
| 1,933,797 | Fritts | Nov. 7, 1933 |
| 2,027,369 | Bourges | Jan. 14, 1936 |
| 2,153,892 | Jackman | Apr. 11, 1939 |
| 2,160,818 | Becker | June 6, 1939 |